July 20, 1937.    O. HANSEN    2,087,844
APPARATUS FOR CLEANING EGGS
Filed June 18, 1936    2 Sheets-Sheet 1

Inventor
Ole Hansen,
By [signature]
Attorney

July 20, 1937.  O. HANSEN  2,087,844
APPARATUS FOR CLEANING EGGS
Filed June 18, 1936  2 Sheets-Sheet 2
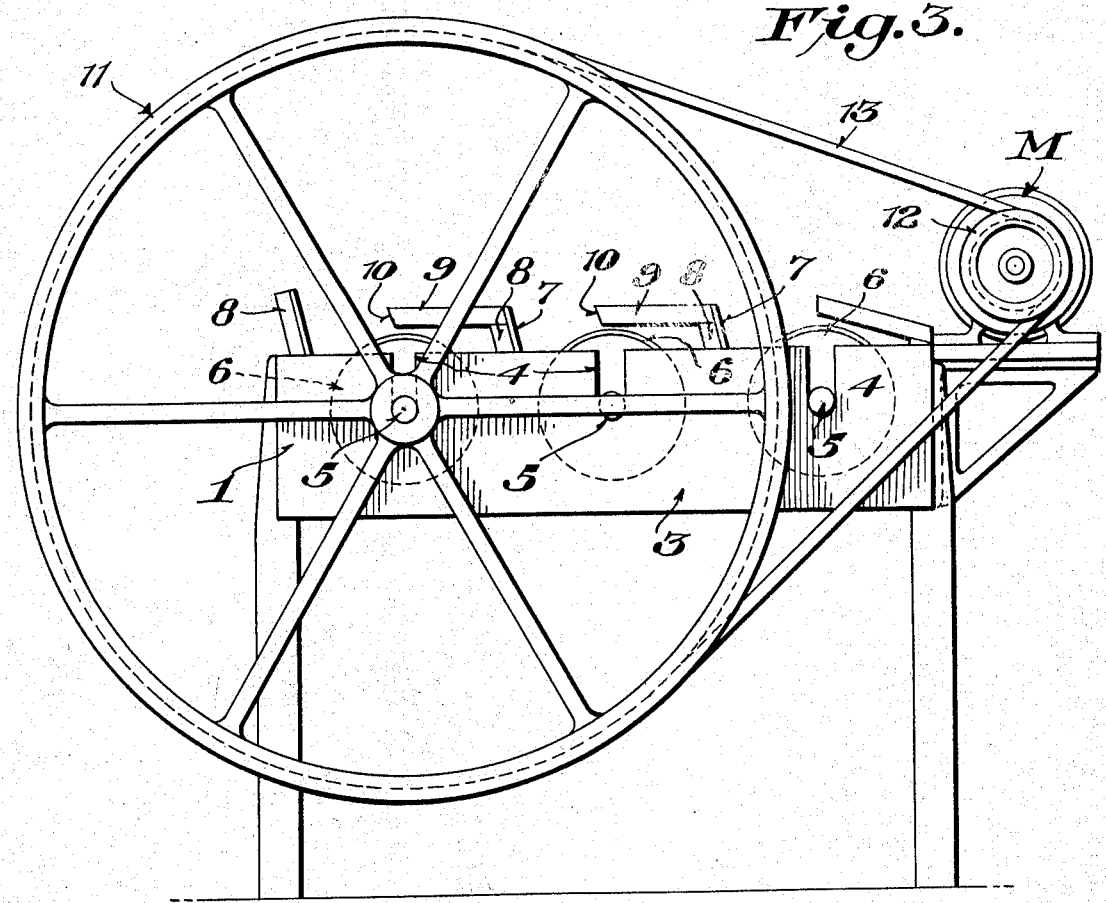
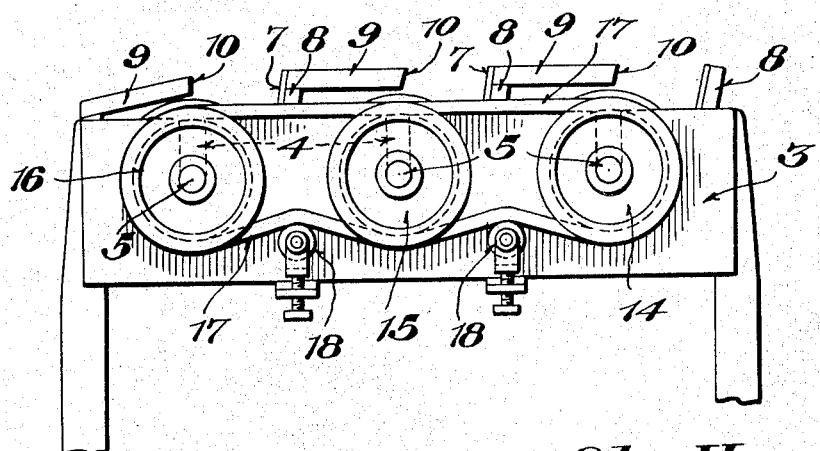
Inventor
Ole Hansen, Patented July 20, 1937

2,087,844

UNITED STATES PATENT OFFICE 2,087,844

APPARATUS FOR CLEANING EGGS

Ole Hansen, Menan, Idaho

Application June 18, 1936, Serial No. 85,981

2 Claims. (Cl. 146—198)

This invention relates to apparatus for cleaning eggs so that the shells thereof will have a uniformly fresh appearance for marketing.

A primary object of the invention is to provide means for subjecting the shell to a cleansing bath with the aid of a soft frictional surface in such a manner that during the course of treatment the entire shell is subjected to a gentle scrubbing action throughout its entire surface as it revolves in a predetermined position.

Another object of the invention is to provide an apparatus that is capable of being constructed in units to obtain the desired capacity according to the demands of the particular user.

A further object is to provide a simple and practical form of apparatus which is inexpensive to manufacture and maintain and which may be readily kept in a proper sanitary condition.

With the above and other objects in view which will more readily appear as the nature of the invention is better understood, the same consists in the novel construction, combination and arrangements of parts hereinafter more fully described, illustrated and claimed.

A preferred and practical embodiment of the invention is shown in the accompanying drawings, in which:—

Figure 3 is an elevation of one end of the machine.

Figure 4 is an end elevation of the opposite end.

Similar reference characters designate corresponding parts throughout the several figures of the drawings.

Figure 1:
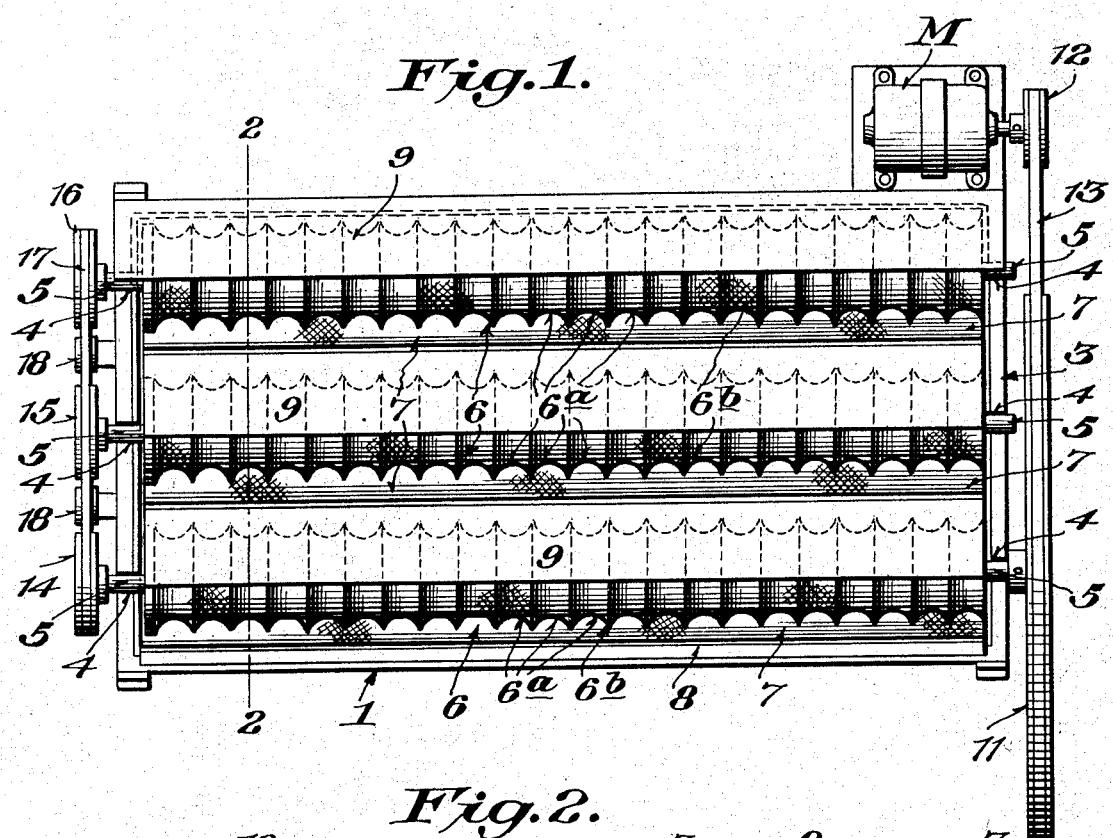
Figure 1 is a top plan view of the improved apparatus.

In its primary aspect the present invention includes in its organization a receptacle or tank designated generally as 1 and having a water outlet valve 2 at the bottom thereof while the opposite end walls 3 are provided with bearings 4 to receive the journal portions 5 of a plurality of egg cleaning rollers 6.

Each egg cleaning unit comprises one of the rollers 6 above referred to and an abutment or guide wall providing a plane surface 7 which is preferably formed by an upwardly inclined member 8 disposed adjacent the upwardly rotating side of the roller 6. Each roller 6 is provided with a series of annular grooves providing a plurality of pockets 6a and, as shown, the surface of the roller is provided with a soft covering 6b preferably of fabric, felt or other material which will not only absorb and carry water but will also subject the shell of the egg to a gentle scrubbing action. It will thus be apparent that the grooved and covered surface of the roller 6 and the plane fabric covered surface 7 of the member 8 cooperate to provide a multiplicity of pockets for the egg or eggs designated generally as E. In other words, the surface 6b of the roller, and the surface 7 of the guide member 8 provide a series of pockets to separately receive a plurality of eggs so that the continued operation of the roller will cause each egg to be cleaned as desired or necessary. After each egg has been revolved in its pocket and subjected to the required scrubbing action of the roller and its corresponding abutment surface it is removed from the machine by hand by the operator.

As will be observed from the drawings it is also preferred to provide a guard element 9 overlying the upper periphery of the rollers. In the construction shown this guard member 9 may be in the form of a continuous strip carried by the upper end of the member 8 and projects over the upper half of the roller so as to prevent an egg from being carried over to the far side of the roller as it is subjected to the brushing and scrubbing action. The space between the edge 10 of the guard element 9 and the surface 7, together with each groove 6b, provides in effect an egg cleaning trough for each individual egg.

In practice the receptacle or tank 1 is filled with water to a sufficient level to immerse the lower portions of the rollers 6 so that the coverings 6a thereof will always carry a fresh supply of water to the particular egg or eggs being treated. At the same time, due to the fact that the covering 6a runs through the water path in the tank the said surface will be kept clean and sanitary at all times. The tank 1 may be emptied by opening the valve 2 and replenishing the supply of water as desired.

In the apparatus shown a plurality of cleaning units of similar construction is shown to obtain adequate capacity. Each roller 6 is preferably rotated in the same direction. To that end various expedients may be employed. For example, one of the rollers 6 may be equipped with a wheel 11 or its equivalent which is driven by an electric motor M suitably mounted on the receptacle 1 and having a pulley or wheel 12 connected with the wheel 11 by a belt 13 or its equivalent. This structure is located at one end of the receptacle and although the arrangement shown has proven practical in actual use nevertheless it will be understood that any suitable means may be used which will provide the desired speed reduction between the motor and the wheel or gear which drives the particular roller carrying the wheel 11 or its equivalent.

Figure 2:
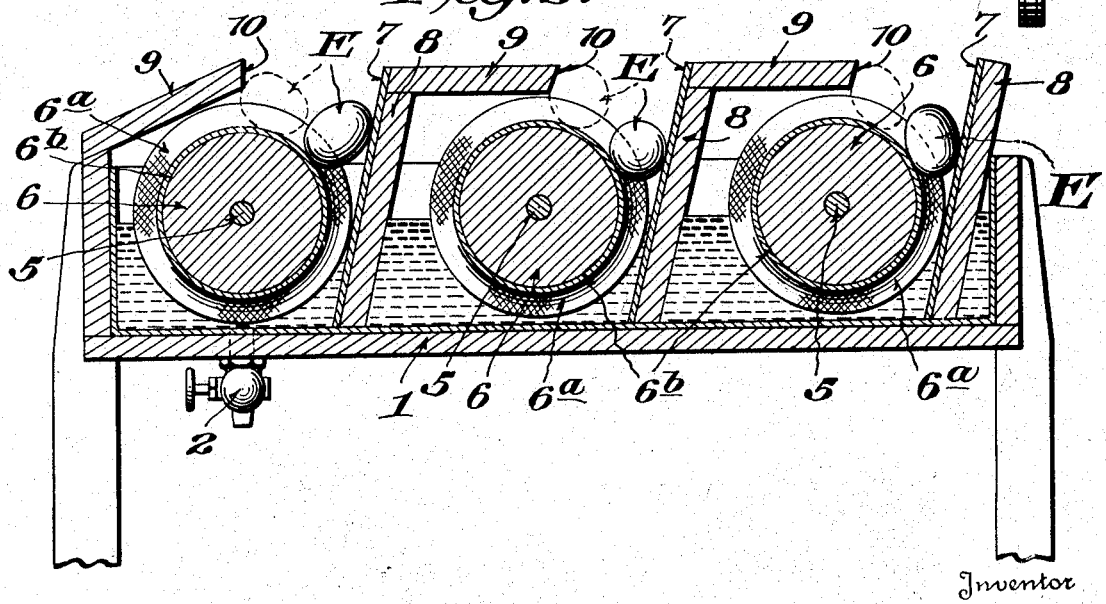
Figure 2 is a transverse vertical sectional view taken on the line 2—2 of Fig. 1.

The end of the machine opposite the driving means above described preferably carries means for transmitting motion to adjacent rollers. As will be observed from Fig. 4 for example, the driven roller 6 is provided with a pulley 14. Additional rollers are provided with pulleys 15 and 16. All of the pulleys are carried by the journal portions 5 of the several rollers. A belt 17 operatively connects the pulleys 14, 15 and 16 and to insure proper peripheral contact between the belt and the intermediate pulley 15 suitable slack take-up rollers 18 are provided. These rollers are preferably mounted on the exterior end wall of the machine and may be adjustable by means of a screw or its equivalent so as to exert upward pressure on the lower reach of the belt 17. Thus, it will be apparent that if power is applied to the roller 6 having the pulley 14, all of the rollers will be rotated in the same direction, as indicated in Fig. 2 for example.

From the foregoing it will be apparent that the distinctive feature of the invention resides in providing an egg cleaning unit consisting of a power driven roller 6 having a soft covering and provided with a grooved surface for simultaneously cleaning a plurality of eggs with the aid of the guiding surface 7. During the traveling movement of the roller all portions of the egg shell will be turned into contact with the surface 6a of the roller thus insuring proper and adequate cleaning as the egg is held in its particular pocket. The operator and his assistant fill all of the pockets with eggs and let each egg remain long enough to be properly cleaned. Upon its removal another egg to be cleaned may be put in its place. Thus each egg may be treated according to its individual requirements.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. An egg cleaning machine comprising a tank to contain a cleaning liquid, a roller mounted to rotate about a substantially horizontal axis with its bottom portion disposed to be immersed in liquid contained within said tank, said roller having an annular groove and a scrubbing lining therefor, a substantially vertically disposed wall constituting a side of the tank and having a planar scrubbing surface adjacent to and facing the upwardly movable side of said roller, the tank being open at its top above the upwardly movable side of said roller to permit eggs to be deposited between the said upwardly movable side of said roller and said planar scrubbing surface, and a cover over the top of the tank above the downwardly movable side of said roller, said cover having an edge disposed approximately over the middle of the roller adjacent to the top thereof and facing the planar scrubbing surface to constitute an abutment to limit movement with the roller of an egg disposed in the groove of said roller.

2. An egg cleaning machine comprising a tank to contain a cleaning liquid, substantially vertically disposed partitions dividing said tank into a plurality of compartments, a roller in each compartment mounted to rotate about a substantially horizontal axis with its bottom portion disposed to be immersed in the liquid contained in the related compartment, each roller having an annular groove and a scrubbing lining therefor, each partition being disposed adjacent to the upwardly movable side of a related roller and having a planar scrubbing surface adjacent to and facing such roller, each compartment being open at its top above the upwardly movable side of the related roller to permit eggs to be deposited between the upwardly movable side of the related roller and the related planar scrubbing surface, a cover extending from each partition over the top of an adjacent compartment above the downwardly movable side of the roller in such compartment, each cover having an edge disposed approximately over the middle of a related roller adjacent to the top thereof and facing the related planar scrubbing surface to constitute an abutment to limit movement with the roller of an egg disposed in the groove thereof.

OLE HANSEN.